(12) United States Patent
Cunningham

(10) Patent No.: US 8,315,525 B2
(45) Date of Patent: Nov. 20, 2012

(54) AMPLIFICATION OF INTERLEAVED OPTICAL SIGNALS

(75) Inventor: James A. Cunningham, Dayton, OH (US)

(73) Assignee: Exelis Inc., McLean, VA (US)

(*) Notice: Subject to any disclaimer, the term of this patent is extended or adjusted under 35 U.S.C. 154(b) by 400 days.

(21) Appl. No.: 12/775,922

(22) Filed: May 7, 2010

(65) Prior Publication Data

US 2011/0274432 A1 Nov. 10, 2011

(51) Int. Cl.
*H04J 14/02* (2006.01)
(52) U.S. Cl. .......................................... 398/96
(58) Field of Classification Search .................. 398/96, 398/118
See application file for complete search history.

(56) References Cited

U.S. PATENT DOCUMENTS

| | | |
|---|---|---|
| 7,609,972 B2 | 10/2009 | Cunningham et al. |
| 2002/0089726 A1* | 7/2002 | He et al. .................... 359/172 |
| 2008/0181617 A1 | 7/2008 | Ann |

FOREIGN PATENT DOCUMENTS

| | | |
|---|---|---|
| EP | 0653852 A1 | 5/1995 |
| EP | 1130808 A2 | 9/2001 |

OTHER PUBLICATIONS

Extended Search Report in counterpart European Application No. 11162398.9, mailed Aug. 19, 2011.

* cited by examiner

*Primary Examiner* — Shi K Li
(74) *Attorney, Agent, or Firm* — Edell, Shapiro & Finnan, LLC

(57) ABSTRACT

A technique for generating a data signal and a beacon signal for free space optical communications involves generating a data signal having a first optical wavelength and a beacon signal having a second optical wavelength. The data signal is encoded with data via modulation at a first modulation rate. The beacon signal is an inverted version of the data signal and can be further modulated at a second modulation rate that is less than the first modulation rate. The data and beacon signals are optically combined to produce a combined signal in which power attributable to the beacon signal is interleaved with and substantially non-overlapping temporally with power attributable to the data signal. The combined signal is amplified via a fiber amplifier, and the combined signal is supplied to transmitter optics for transmitting the data signal and the beacon signal into free space.

21 Claims, 7 Drawing Sheets

AMPLIFICATION OF INTERLEAVED OPTICAL SIGNALS

BACKGROUND

Free-space optical communication systems are capable of transmitting data at very high data rates over long distances. Acquisition schemes and precise beam pointing and tracking capabilities are required to communicate between moving platforms (e.g., airborne, space, and ground vehicles). Particularly with airborne platforms, where movement of aircraft can be rapid and unpredictable, it is critical that the pointing and tracking scheme provide accurate guidance for directing the data laser beams.

Consider a scenario in which two optical communication terminals whose relative positions may change are engaged in two-way communication (e.g., either one or both of the terminals are mobile). In each terminal, one option for determining the angular direction of the other terminal (i.e., the far-end terminal) is to split off a portion of the data signal (e.g., a laser beam) received from the far-end terminal and determine the angle of arrival of the split-off data signal. This approach has a number of disadvantages. The received signal power must be split between two detectors, one for detecting the pointing angle and one for receiving the data. By using a portion of the received data signal for angular position detection, only the remaining portion of the received data signal is available for reception of the data, thereby reducing the signal power at the receiver and reducing the maximum operating range of the system. Moreover, it is desirable to minimize the beamwidth of the data signal in order to maximize signal strength and operating range. Given the limited angular extent of the data signal, initial acquisition of a remote terminal is difficult with the data signal. Likewise, once a communication link has been established between terminals, it may be difficult for the terminals to continuously track each other using narrow data signal laser beams, since either terminal can fairly quickly move out of the beam when the relative angular direction of the terminals is changing rapidly.

Another option for determining the angular direction of a far-end terminal is to separately generate and transmit both a data signal and a beacon signal. The beacon signal can have a wider beamwidth, which is more suitable for acquisition and tracking. However, if two separate signals are created, the size, weight, and power of the system is typically doubled. Further, the two signals must be combined together at high power which is typically done in free space using costly optics that require careful alignment. Accordingly, there remains a need for a system capable of generating two optical signals, such as data and beacon signals in an optical communication system, without significantly increasing the size, weight, and power of the system relative to a single signal system and without diminishing signal power.

SUMMARY

A technique for generating a data signal and a beacon signal for free space optical communications involves generating a data signal having a first optical wavelength and a beacon signal having a second optical wavelength. The data signal is encoded with data via modulation at a first modulation rate. The beacon signal is an inverted version of the data signal and can be further modulated at a second modulation rate that is less than the first modulation rate. The data and beacon signals are optically combined to produce a combined signal in which power attributable to the beacon signal is interleaved with and substantially non-overlapping temporally with power attributable to the data signal. The combined signal is amplified via a fiber amplifier, and the combined signal is supplied to transmitter optics for transmitting the data signal and the beacon signal into free space.

The interleaving technique of the invention permits both the data signal and the beacon signal to be amplified using a single amplifier, such as an erbium-doped fiber amplifier, while still permitting both signals to be amplified to the full extent of the power amplification available from the amplifier. Due to the generation of a distinct beacon signal for acquisition and tracking, there is no need to use a portion of the data signal at the far-end receiver for this purpose, so that there is no diminishment of the signal power available for detection of the data signal at a far-end receiver. Nevertheless, the beacon signal is generated without substantially increasing the size, weight, power, and cost requirements of an optical transmitter system. Modulation of the beacon signal at a lower modulation rate using, for example, on-off keying simplifies detection of the beacon signal at the far-end receiver.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Described herein is a technique for creating data and beacon signals for free space optical communication in which only a single amplifier, such as an erbium-doped fiber amplifier, is required to amplify both signals prior to transmission. By generating the beacon signal using the shape of the data signal, the power of the beacon signal is interleaved with and does not temporally overlap the power of the data signal when the data and beacon signals are optically combined. The two signals can be combined at low power and then amplified together using a common amplifier. In this manner, the full peak power of the amplifier is obtained in the data signal, and the beacon signal is able to use the amplifier during times when it is not needed by the data signal to create a full peak power but half average power beacon signal. As a result, a beacon signal can be transmitted without reducing the available power for the data signal and without significantly increasing the size, weight, and cost of the transmitter system.

Figure 1:
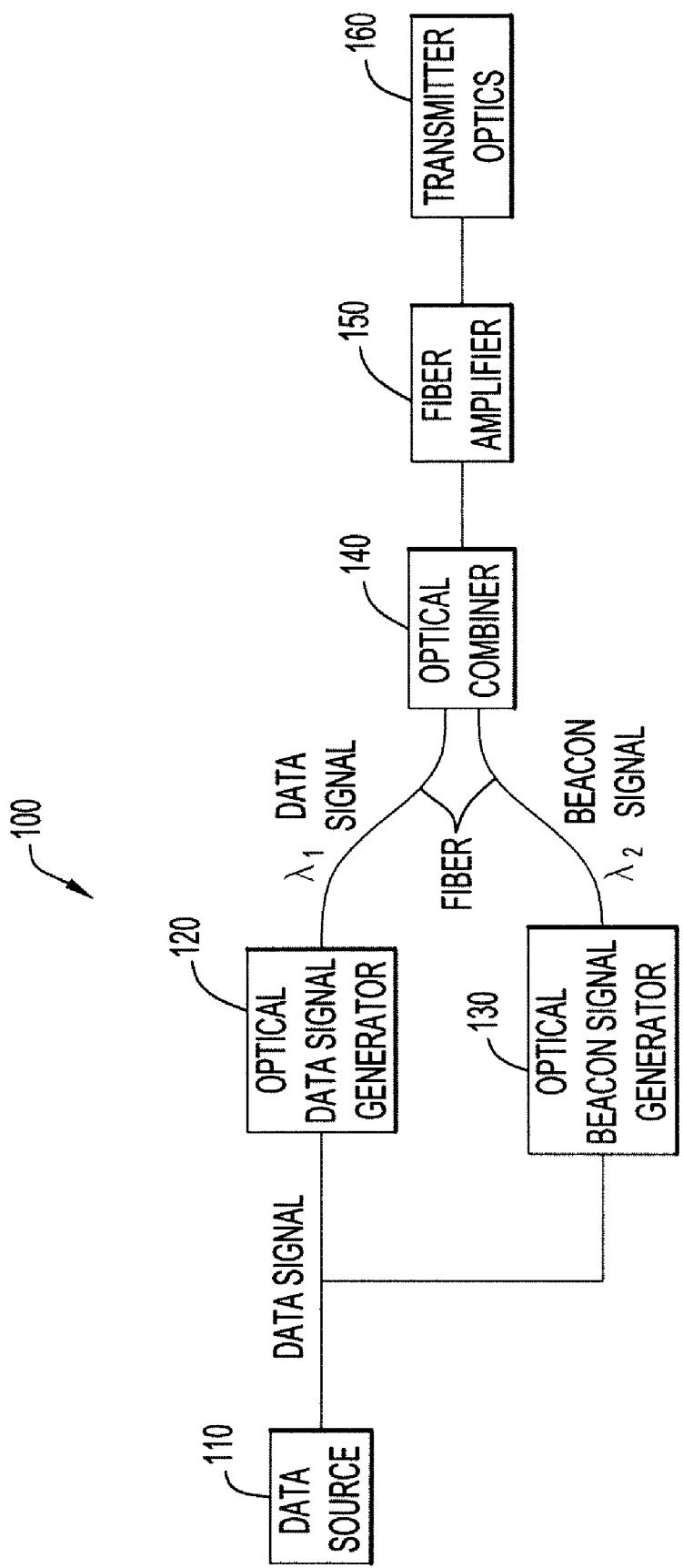
FIG. 1 is a top-level block diagram of an example transmitter system that illustrates the concepts of the invention.

FIG. 1 is a top-level block diagram of an example transmitter system 100 that illustrates the concepts of the invention. A data signal is supplied by a data source 110, such as a modem. The data signal can be an electrical signal encoded with data to be transmitted to a far-end terminal. For example, data source 110 can encode data into the data signal via on-off keying (OOK) at a first modulation rate. With OOK modulation, the data signal sequentially alternates between a first power level and a second power level that is preferably a very low or zero power level, resulting in intervals of full power and intervals of substantially no power. A logical "0" can be represented by the absence of power over an interval, and a logical "1" can be represented by the presence of power over an interval, or vice versa. Optionally, an encoding scheme can be employed which ensures an on/off duty cycle of about 50% (i.e., the signal is at full power about half of the time and at zero power about half of the time). To convey information rapidly, the first modulation rate can be at least one megahertz (MHz) and may be many orders of magnitude higher, possibly exceeding one or many gigahertz (GHz).

The data signal can be used to transmit virtually any type of information or data including, but not limited to: sensor data, navigation signals, voice/audio signals, image signals, video signals, data relating to an application running on a processor, control signals, and overhead or communication protocol signals (e.g., relating to the communication protocol, handshaking, routing, equipment configuration, etc.). In particular, sensors that collect information for intelligence, surveillance, and reconnaissance generate a substantial amount of data and can benefit from the high data rates employed in optical communications to transmit the information in a reasonable amount of time.

The data signal is supplied to an optical data signal generator 120 on a data signal path and to an optical beacon signal generator 130 on a beacon signal path that is in parallel with the data signal path. Optical data signal generator 120 converts the data signal to an optical signal at a first optical wavelength $\lambda_1$ which is supplied as an output on an optical fiber. The output optical data signal preserves the data modulation at the first modulation rate contained in the original data signal.

Optical beacon signal generator 130 converts the data signal to an optical beacon signal at a second optical wavelength $\lambda_2$ that is different from the first optical wavelength $\lambda_1$. The beacon signal is a modified, inverted version of the data signal. In particular, the beacon signal preserves the data modulation of the data signal, but the beacon signal has power during certain time intervals in which the data signal has no power, and the beacon signal has no power during the time intervals in which the data signal has power. Additionally, optical beacon signal generator 130 further modulates the beacon signal at a second modulation rate that is less than the first modulation rate (e.g., at least an order of magnitude less and perhaps several orders of magnitude less), as described in greater detail below. Optical beacon signal generator 130 supplies the optical beacon signal as an output on an optical fiber. Thus, the resulting beacon signal is modulated at the first (data) modulation rate, albeit in an inverted form, and at the second (beacon) modulation rate that is less than the data modulation rate.

An optical combiner 140 receives the optical fibers from optical data signal generator 120 and optical beacon signal generator 130, respectively containing the data and beacon signals at optical wavelengths $\lambda_1$ and $\lambda_2$, and combines the data and beacon signals into a combined signal on a common output fiber. Due to inversion of the beacon signal relative to the data signal, within the combined signal, power attributable to the beacon signal is interleaved with and substantially non-overlapping temporally with power attributable to the data signal. The combined signal is supplied to a fiber amplifier 150, which amplifies the combined signal. In this manner a common amplifier amplifies both the data signal and the beacon signal without sacrificing full amplification of either signal. The amplified, combined signal is then supplied to transmitter optics 160, which transmit the data and beacon signals into free space. Transmitter optics 160 may discriminate between the data and beacon signal based on their different wavelengths in order to separately process the signals. For example, the data and beacon signals may be directed to different paths, and a greater beam divergence may be applied to the beacon signal in order to produce a wider beamwidth.

By way of example, the optical wavelengths used for transmitting and receiving the data and beacon laser beams can be in the eye-safe region of the spectrum (i.e., wavelengths longer than about 1.4 microns), such as wavelengths in the telecommunications C and L bands or between about 1530 nm and 1600 nm. These wavelengths permit commercially-available optical components to be used in the laser transceiver. Nevertheless, the invention is not limited to any particular range of optical wavelengths. Thus, as used herein and in the claims, the term "optical" refers generally to the range of wavelengths of electromagnetic signals within which "optical" equipment (e.g., optical communication equipment, transmitters, receivers, etc.) typically operates, including the visible spectrum, infrared wavelengths, and ultraviolet wavelengths.

Figure 2:
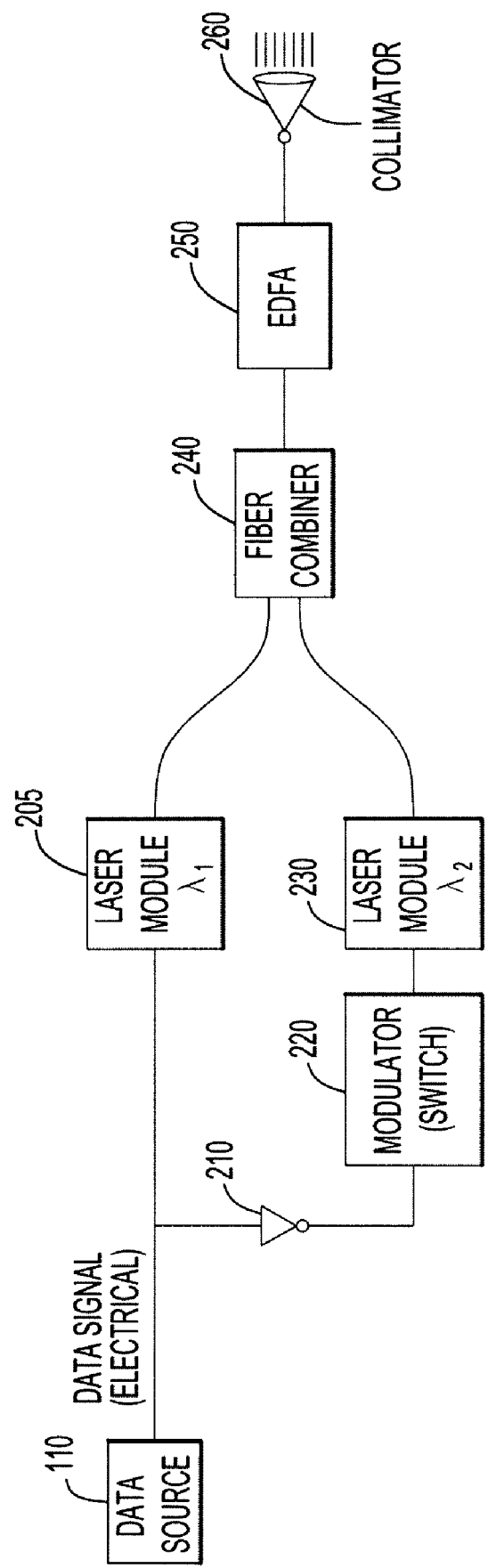
FIG. 2 is a block diagram illustrating an implementation of the transmitter system shown in FIG. 1.

FIG. 2 is a block diagram illustrating one implementation of the transmitter system 100 shown in FIG. 1. In this example, the optical data signal generator comprises a laser module 205 such as a tunable laser seed module, which can be a commercially available small form-factor pluggable (SFP) laser module that provides an interface between a device supplying data (e.g., Ethernet traffic) and an optical fiber. In this example, laser module 205 converts the data signal in electrical form to an optical signal at the first wavelength $\lambda_1$.

The optical beacon signal generator includes an inverter 210, a modulator 220, and a laser module 230 disposed along the beacon signal path. Inverter 210 receives the data signal in electrical form and generates an electrical output signal that is the logical opposite of the data signal (i.e., the output signal is a logical "1" when the data signal is a logical "0," and the output signal is a logical "0" when the data signal is a logical "1."

Modulator 220 can be a switch that "chops" the beacon signal by modulating the beacon signal on and off at a relatively low frequency to produce a square-wave signal whose modulation frequency can be detected at the far end, as described in greater detail below. In effect, the switch applies a particular OOK modulation to the beacon signal, but at a significantly lower modulation rate than the data modulation rate (e.g., at least an order of magnitude lower and perhaps several orders of magnitude lower). By way of example, the rate of on/off modulation (i.e., the aforementioned "second" or beacon modulation rate) of the beacon signal can be in the 4 to 15 kHz region and may be programmable. A 50% on/off duty cycle can be used to produce a balanced square wave. In general, the invention is not limited to any particular chopping frequencies or duty cycles; thus, higher or lower frequencies than those in the exemplary range could also be used. However, the data modulation rate should be sufficiently higher than the beacon modulation rate so that the data modulation that remains encoded in the beacon signal is not detectable or "seen" by the beacon detector at the far end. In the context of this example, the beacon modulation rate should be below about 1 MHz to be clearly distinguishable from the data modulation rate.

The inverted and modulated (chopped) data signal is then supplied along the beacon signal path to laser module 230 which can be similar to laser module 205 on the data signal path (e.g., a tunable laser seed module or SFP), which converts the input electrical signal to an optical signal at the second optical wavelength $\lambda_2$ to produce the optical beacon signal.

Figure 3:
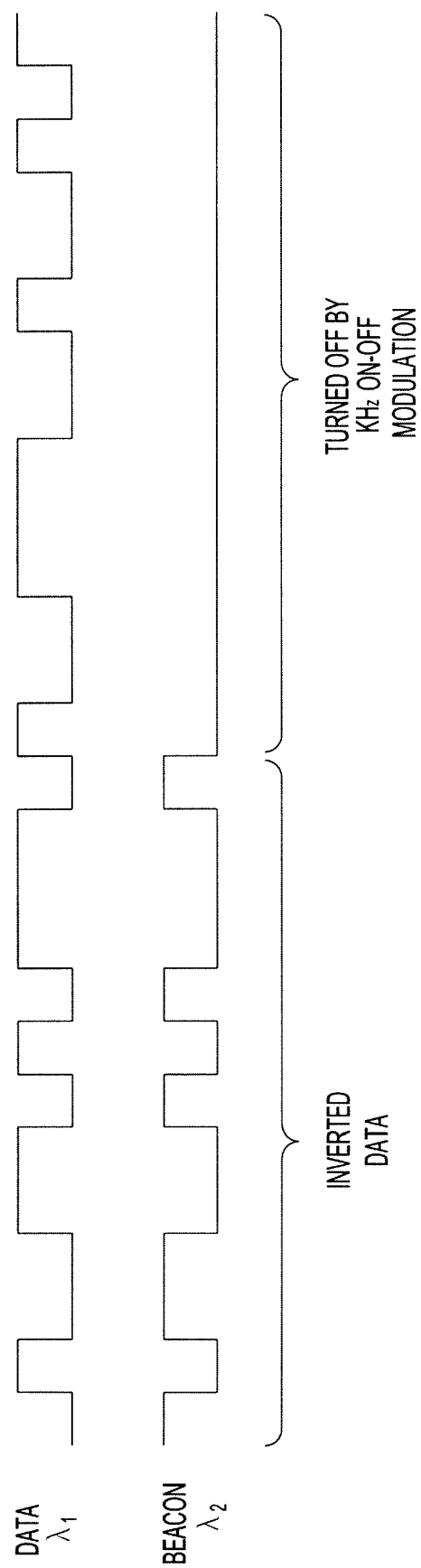
FIG. 3 is a signal timing diagram showing segments of the data and beacon signals generated by a transmitter system according to an embodiment of the invention.

FIG. 3 is a timing diagram showing representative portions of the data and beacon signals one above the other for comparison. The data signal is modulated at a first (data) modulation rate and comprises a sequence of logical ones and zeros resulting in a signal that alternates between a first state in which power is present and a second state in which substantially no power is present in accordance with the data values being transmitted. As shown on the left side of FIG. 3, portions of the beacon signal contain the same data modulation as the data signal, except that the beacon signal comprises inverted data whose logical state is the opposite of that of the data signal, such that the beacon signal contains power during the intervals in which the data signal does not contain power, and the beacon signal does not contain power during the intervals in which the data signal contains power. The on-off modulation of the beacon signal results in portions of the beacon signal remaining in a logic zero state (no power). These portions of the beacon signal do not contain the inverted data modulation. Note that the rate of this on-off modulation of the beacon signal is at a significantly lower rate than the data modulation.

Figure 4:
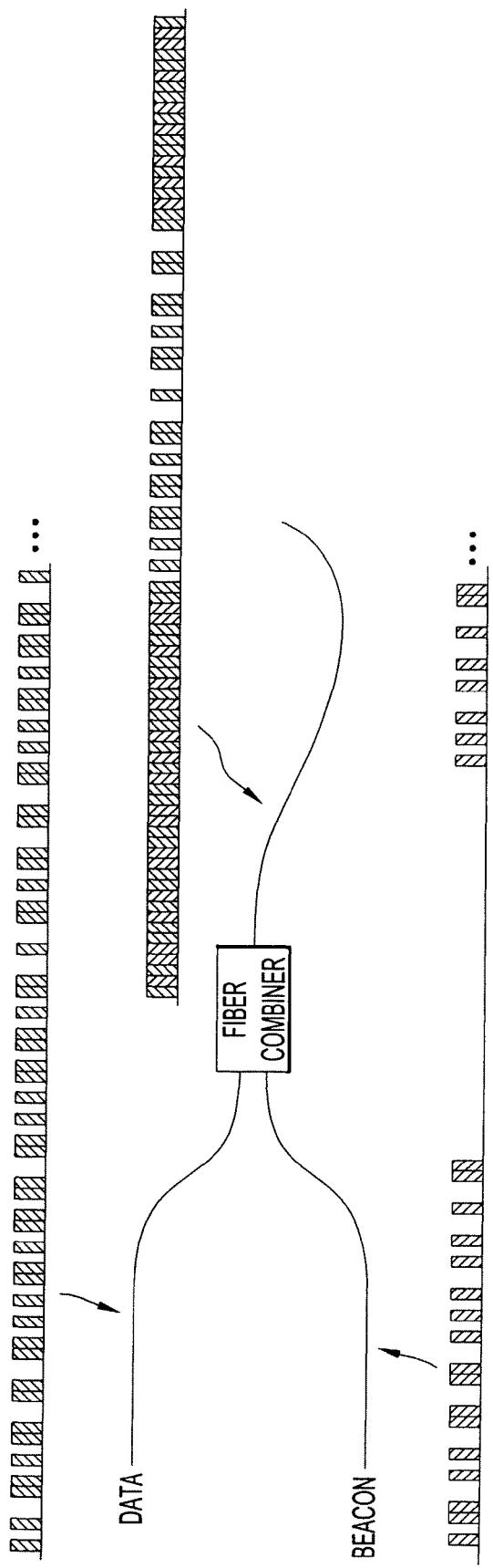
FIG. 4 is a diagram conceptually illustrating combining of the data and beacon signals in an interleaved, non-overlapping manner.

Referring again to FIG. 2, the optical combiner can be implemented with a fiber combiner 240 which combines the data and beacon signals in fiber. FIG. 4 illustrates the effect of combining the data and beacon signals. In the combined signal, the portions of the data signal containing signal power (shown with left-to-right upward-slanting cross hatching in FIG. 4) are interleaved with the portions of the beacon signal containing signal power (shown with left-to-right downward-slanting crosshatching in FIG. 4) such that the power of the two signals is substantially non-overlapping temporally. Note that the two signal are still distinguishable by virtue of their different wavelengths. Moreover, during periods in which the beacon signal is switched off due to the on-off modulation, only the data signal is present in the combined signal.

As shown in FIG. 2, the fiber amplifier can be implemented with a single mode erbium-doped fiber amplifier (EDFA) 250 whose output can be supplied to a collimator 260 which receives the combined signal at the fiber end and supplies a free space collimated beam to the transmitter optics. The wavelengths of the data and beacon signals ($\lambda_1$, $\lambda_2$) can be selected to be within the amplification band of EDFA 250. If, for example, EDFA 250 has a peak power of 5 watts, a typical data stream, with an equal number of logical zeros and ones, will have an average data power of 2.5 watts. By using the logical zero slots for transmission of the beacon signal, the beacon signal will not use any of the power of the data signal. Assuming a beacon modulation duty cycle of 50% at a kHz-level rate, the beacon signal will be produced with an average power of 1.25 watts by using the 2.5 watts of "left over" power available from EDFA 250 during half of the periods when the data signal is in a logical zero state. Notice that each of the two signals in the combined signal is output from EDFA 250 at the peak power setting of EDFA 250.

A separate beacon wavelength allows full use of incoming beacon signal at the far-end receiver rather than splitting off a fraction of the received data signal and tracking either the DC data signal or a small amplitude lower frequency modulation on top of the data signal.

The chopped beacon signal provides a number of advantages. A unique beacon chopping frequency (second modulation rate) can be used for each terminal in an optical communication system, such that detection of the chopping frequency identifies which terminal is sending the beacon signal. For example, two terminals can establish optical communication with each other and maintain track, where one terminal employs a beacon chopping frequency of 6,000 Hz and the other terminal employs a beacon chopping frequency of 9,000 Hz.

Another advantage of the chopped beacon signal is that every terminal can transmit and receive beacon signals on the same wavelength, since the beacon chopping frequency can be used to differentiate one beacon signal from another. By assigning a different beacon modulation frequency to each of the two transceivers in the link, the beacon modulation provides a means of diminishing potential self-interference arising from reflections of the outgoing transmit beacon. Further, this greatly simplifies the overall beacon design and system architecture, since neither the beacon laser module or receiver needs to be tunable or adjusted (the beacon signal can always be detected without tuning) and the beacon hardware can be identical in all terminals. For example, in the implementation in FIG. 2, laser module 230 would not need to be tunable. Note that it is much easier from a design and operation standpoint to adjust the chopping frequency of the beacon signal to provide differentiation between beacon signals than to use different wavelengths as a differentiator. Optionally, of course, both different chopping frequencies and different optical wavelengths can be used to differentiate source terminals if necessary.

Another advantage of chopping the beacon signal is that the on/off modulation creates a square-wave AC signal whose frequency is that of the chopping frequency. Consequently, the chopped beacon laser signal can be AC coupled to a position sensor detector in the far-end terminal. By AC coupling the position sensor detector, continuous signals that create a DC bias do not affect the detection process. Thus, for example, unwanted signals such as stray background light, solar radiation including direct and indirect sunlight, and glint, which tend to be constantly streaming light, merely cause a DC signal bias when detected along with the chopped beacon signal and are automatically filtered out by the AC coupling. Modulating the beacon also facilitates accurate measurements over a wide range of environmental conditions since the AC coupling within the high gain signal chain is immune to various DC offsets and offset drifts arising from operational amplifiers and detector leakage. Bandpass filtering of the received beacon signal can also attenuate the effects of electromagnetic interference from hum-inducing 50-400 Hz power lines or other noise sources in the environment. Consequently, the chopped beacon laser beam provides additional immunity to these types of interference, and permits the optical communication terminals to maintain track of far-end terminals when such interference is present.

Further, current AC-coupled position sensing detectors for determining the angle of arrival of laser beams have frequency bandwidths that extend up to only a few megahertz. In optical communications, data can be modulated onto the laser beam using modulation on the order of gigahertz up to hundreds of gigahertz. This modulation makes the data-carrying laser beams virtually invisible to AC-coupled position sensing detectors, which currently do not have the bandwidth to sense the gigahertz modulation frequencies. Consequently, the data modulation that remains in the beacon signal (at the MHz rate or higher) is too high in frequency to be detected by the beacon detector at the far end in this scheme. Instead, the far-end beacon receiver electronics see only the kHz frequency modulation.

The example described above involves modulating the beacon signal at a second modulation rate that is less than the data modulation rate to provide these advantages in detecting the beacon signal at the far-end receiver. However, the invention is not limited to schemes that require further modulation of the beacon signal, and the beacon signal can be transmitted without further modulation (other than the data modulation), and other detection schemes can be used at the far-end receiver to detect the beacon signal. The transmitter optics may apply a greater beam divergence to the beacon signal than to the data signal to assist in acquisition and tracking using the beacon signal.

Figure 5:
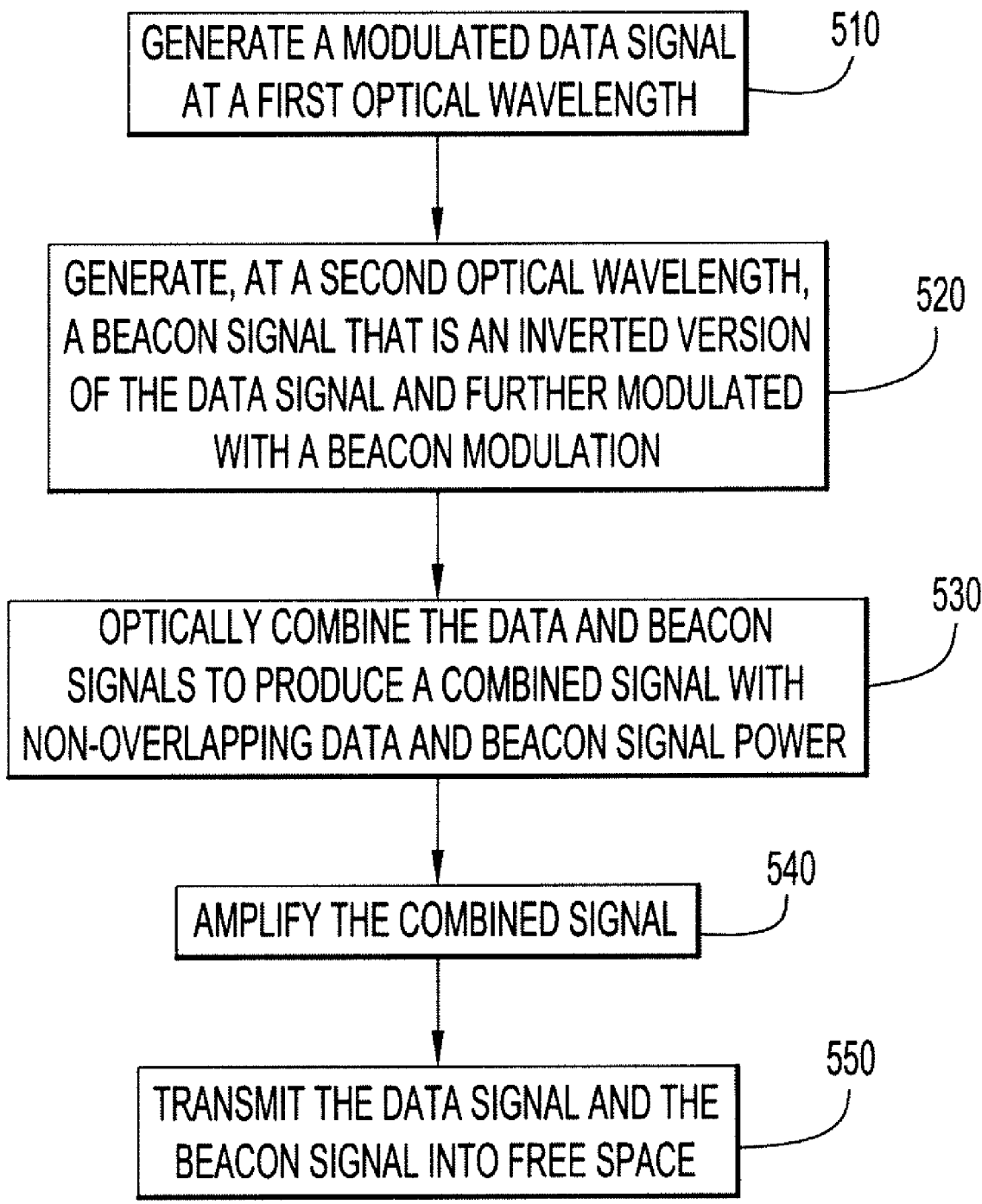
FIG. 5 is functional flow diagram illustrating the operations performed in generating the signal and beacon signals according to an embodiment of the invention.

FIG. 5 is a functional flow chart summarizing the operations performed to generate optical data and beacon signals, as described above in connection with FIG. 1. In operation 510, a data signal having a first optical wavelength is generated, where the data signal is modulated at a first (data) modulation rate to encode data. In operation 520, a beacon signal having a second optical wavelength is generated. The beacon signal is an inverted version of the data signal and, optionally, is further modulated at a second (beacon) modulation rate that is less than the first modulation rate. The data and beacon signals are optically combined in operation 530 to produce a combined signal in which power attributable to the beacon signal is interleaved with and substantially non-overlapping temporally with power attributable to the data signal. The combined signal is then amplified (operation 540) and the data signal and the beacon signal are transmitted into free space (operation 550).

Figure 6:
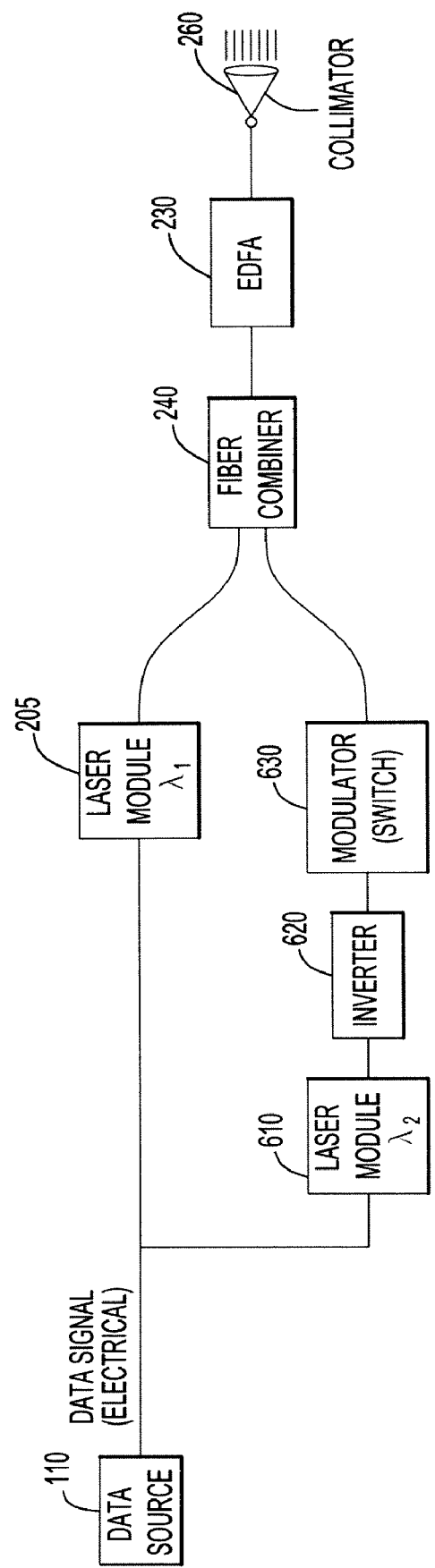
FIG. 6 is a block diagram illustrating an implementation of the transmitter system shown in FIG. 1.
Figure 7:
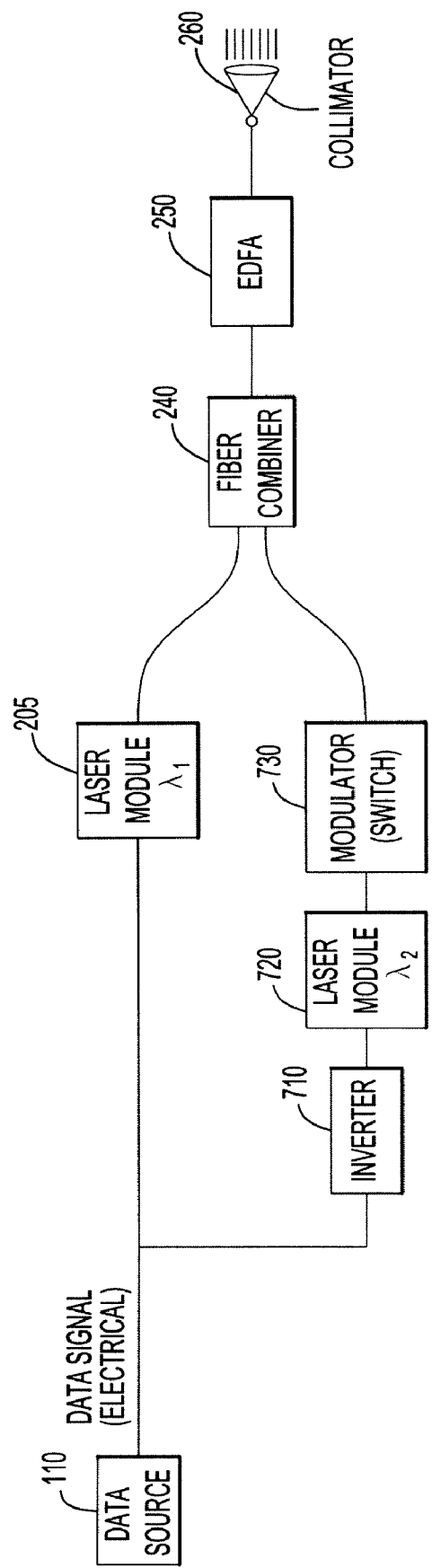
FIG. 7 is a block diagram illustrating an implementation of the transmitter system shown in FIG. 1.

In FIG. 2, the optical beacon signal generator is implemented with an inverter 210, a modulator (switch) 220, and a laser module 230 arranged in sequence along the beacon signal path. It will be appreciated, however, that the invention is not limited to this particular configuration or arrangement. The block diagrams shown in FIGS. 6 and 7 illustrate other possible implementations of the transmitter system. For example, in FIG. 6, a laser module 610 is disposed upstream of an inverter 620 and a modulator 630. In this case, inverter 620 and modulator 630 operate on the optical data signal at wavelength $\lambda_2$ rather than on an electrical signal as in the case of the arrangement in FIG. 2. In FIG. 7, an inverter 710 is disposed upstream of a laser module 720, which in turn is upstream of a modulator 710. Here, inverter 730 operates on an electric signal, whereas modulator 730 operates on the optical signal produced by laser module 720.

Moreover, while the systems shown in FIGS. 2, 6, and 7 involve optical signals being conveyed, combined, and amplified via optical fibers and a fiber amplifier, the principles of the invention can be employed in the context of any of a wide variety of signal conveying, combining, and amplifying mechanisms. For example, the data and beacon signals can be combined and amplified in free space rather than in fiber.

The data and beacon signals can be generated by any of a wide variety of devices, and the invention is not limited to these examples. One or more of the inversion, modulation, and optical conversion operations carried out to create the beacon signal can be performed by a single device or can be performed by devices contained in a common integrated circuit. For example, inversion and beacon modulation can be performed by a single chip or device, or the laser module may contain a switching mechanism that performs the on-off modulation. Further, the modulator switch and/or the inverter can be implemented in hardware or firmware such as FPGA logic. Regardless of the particular mechanisms used, creation of the data and beacon signals requires that the signals can be combined in an interleaved manner without the power attributable to the two signals substantially temporally overlapping so that the signals can be fully amplified by a common amplifier. This is accomplished in this example by having the beacon signal include the same data modulation pattern as the data signal but in an inverted form.

In the examples described above, the beacon signal is modulated primarily for the purpose of enabling detection of the beacon signal (e.g., by detecting a square wave at a particular frequency in the kilohertz range). However, it is also possible to modulate the beacon signal at the second modulation rate to encode further data in the beacon signal. For example, control information relating to beacon tracking could be encoded in the signal by employing OOK modulation at the second modulation rate rather than simply switching the beacon signal on and off at a constant frequency.

The transmitter system for generating optical data and beacon signals described herein can be employed in an optical (e.g., laser) communication terminal designed to operate in a laser communication system with moving platforms, where the relative positions of terminals change over time. The system can include, for example, terminals mounted on airborne platforms, satellites, ships, watercraft, or ground vehicles, as well as stationary terminals that communicate with terminals mounted on moving platforms (e.g., combinations of air-to-air and air-to-ground links).

While the invention has been described in the context of free space optical communications where a beacon signal is used for acquisition and tracking and a separate data signal is used to convey data, more generally the concepts of the invention can be used in an optical system where two optical signals are to be transmitted and one of the signals requires a relatively higher modulation rate. For example, OOK modulation at a first modulation rate can be applied to a common signal to encode data, and the common signal can be supplied to first and second signal paths in the manner described above. A first optical signal having a first optical wavelength can be generated from the common signal supplied to the first signal path. A second optical signal having a second optical wavelength can be generated from the common signal on the second signal path, wherein the second optical signal comprises an inverted version of the common signal and is further modulated at a second modulation rate that is less than the first modulation rate to encode further data. In other words, the second optical signal need not be a beacon signal for acquisition and tracking but could be another data signal carrying data modulated via the second, lower-frequency modulation. The two signals can then be optically combined to produce a combined signal in which power attributable to the first optical signal is interleaved with and substantially non-overlapping temporally with power attributable to the second optical signal, as previously described. The combined signal can then be amplified, thereby amplifying both the first and second signals. The two signals can then be transmitted. Note that this mechanism is not limited to transmission via free space in a free space optical communication system, and may be used in a system using any optical transmission media.

Having described preferred embodiments of a new and improved technique for amplification of interleaved optical signals, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of generating a data signal and a beacon signal for free space optical communications, the method comprising:
generating a data signal having a first optical wavelength, the data signal being modulated at a first modulation rate to encode data;
generating a beacon signal having a second optical wavelength, the beacon signal comprising an inverted version of the data signal, wherein the beacon signal is further modulated at a second modulation rate that is less than the first modulation rate;
optically combining the data and beacon signals to produce a combined signal in which power attributable to the beacon signal is interleaved with and substantially non-overlapping temporally with power attributable to the data signal;
amplifying the combined signal; and
transmitting the data signal and the beacon signal into free space.

2. The method of claim 1, wherein the first modulation is on/off keying (OOK) modulation at least a megahertz rate, and wherein the second modulation is OOK modulation at a rate less than a megahertz.

3. The method of claim 1, wherein the second modulation has a duty cycle of about 50%.

4. The method of claim 1, wherein the combined signal is amplified by an erbium-doped fiber amplifier (EDFA).

5. The method of claim 1, wherein generating the beacon signal comprises:
supplying the data signal in electrical form to a beacon signal path;
inverting the data signal on the beacon signal path;
modulating the data signal on the beacon signal path at a second modulation rate that is less than the first modulation rate; and
converting the data signal on the beacon signal path to an optical signal at the second optical wavelength, wherein the inverting, modulating, and converting of the data signal along the beacon signal path produce the beacon signal at the second optical wavelength.

6. The method of claim 5, wherein the converting of the data signal to an optical signal is performed downstream of at least one of the inverting of the data signal and the modulating of the data signal on the beacon signal path.

7. The method of claim 5, wherein the converting of the data signal to an optical signal is performed upstream of at least one of the inverting of the data signal and the modulating of the data signal on the beacon signal path.

8. The method of claim 5, wherein the inverting of the data signal is performed downstream of the converting of the data signal to an optical signal.

9. The method of claim 1, wherein generating the data signal comprises:
supplying the data signal in electrical form to a data signal path; and
converting the data signal on the data signal path to the data signal at the first optical wavelength.

10. A method of generating first and second optical signals, comprising:
supplying a common signal to first and second signal paths, the common signal being modulated at a first modulation rate to encode information;
generating, from the common signal on the first signal path, a first optical signal having a first optical wavelength;
generating, from the common signal on the second signal path, a second optical signal having a second optical wavelength, the second optical signal comprising an inverted version of the common signal and being further modulated at a second modulation rate that is less than the first modulation rate;
optically combining the first and second optical signal to produce a combined signal in which power attributable to the first optical signal is interleaved with and substantially non-overlapping temporally with power attributable to the second optical signal;
amplifying the combined signal; and
supplying the combined signal to transmission optics for transmission of the first and second optical signals.

11. An apparatus for generating a data signal and a beacon signal for free space optical communications, comprising:
a data signal generator configured to generate a data signal having a first optical wavelength, the data signal being modulated at a first modulation rate to encode data;
a beacon signal generator configured to generate a beacon signal having a second optical wavelength, the beacon signal comprising an inverted version of the data signal, wherein the beacon signal generator is configured to further modulated the beacon signal at a second modulation rate that is less than the first modulation rate;
an optical combiner configured to optically combine the data and beacon signals to produce a combined signal in which power attributable to the beacon signal is interleaved with and substantially non-overlapping temporally with power attributable to the data signal;
a fiber amplifier configured to amplify the combined signal; and
transmitter optics configured to transmit the data signal and the beacon signal into free space.

12. The apparatus of claim 11, wherein the first modulation is on/off keying (OOK) modulation at least a megahertz rate, and wherein the second modulation is OOK modulation at a rate less than a megahertz.

13. The apparatus of claim 11, wherein the beacon signal generator comprises:
an inverter, a modulator, and a laser module disposed along a beacon signal path configured to receive the data signal in electrical form at an input end and to supply the beacon signal to the optical combiner at an output end, wherein:
the inverter is configured to invert the data signal on the beacon signal path;
the modulator is configured to modulate the data signal on the beacon signal path at the second modulation rate; and
the laser module is configured to convert the data signal on the beacon signal path to an optical signal at the second optical wavelength.

14. The apparatus of claim 13, wherein the modulator comprises a switch configured to apply on-off modulation to the data signal.

15. The apparatus of claim 13, wherein the laser module is disposed downstream of at least one of the inverter and the modulator along the beacon signal path.

16. The apparatus of claim 13, wherein the laser module is disposed upstream of at least one of the inverter and the modulator along the beacon signal path.

17. The apparatus of claim 13, wherein the inverter is disposed downstream of the laser module.

18. The apparatus of claim 11, wherein the data signal generator comprises a laser module configured to convert the data signal in electrical form to the data signal at the first optical wavelength.

19. The apparatus of claim 18, wherein the laser module is a tunable laser seed module.

20. The apparatus of claim 11, wherein the fiber amplifier comprises an erbium-doped fiber amplifier.

21. An apparatus for generating first and second optical signals, comprising:
- means for supplying a common signal to first and second signal paths, the common signal being modulated at a first modulation rate to encode information;
- means for generating, from the common signal on the first signal path, a first optical signal having a first optical wavelength;
- means for generating, from the common signal on the second signal path, a second optical signal having a second optical wavelength, the second optical signal comprising an inverted version of the common signal and being further modulated at a second modulation rate that is less than the first modulation rate;
- means for optically combining the first and second optical signal to produce a combined signal in which power attributable to the first optical signal is interleaved with and substantially non-overlapping temporally with power attributable to the second optical signal;
- means for amplifying the combined signal; and
- means for transmitting the first and second optical signals.

\* \* \* \* \*

UNITED STATES PATENT AND TRADEMARK OFFICE
CERTIFICATE OF CORRECTION

PATENT NO. : 8,315,525 B2  
APPLICATION NO. : 12/775922  
DATED : November 20, 2012  
INVENTOR(S) : James A. Cunningham Page 1 of 1

It is certified that error appears in the above-identified patent and that said Letters Patent is hereby corrected as shown below:

Column 10, line 27, replace "further modulated" with -- further modulate --.

Signed and Sealed this
Nineteenth Day of February, 2013

Teresa Stanek Rea
*Acting Director of the United States Patent and Trademark Office*